United States Patent [19]

Mori

[11] Patent Number: 4,913,857

[45] Date of Patent: Apr. 3, 1990

[54] METHOD FOR MOLDING A TRANSPARENT CAPSULE

[76] Inventor: Kei Mori, 3-16-3-501, Kaminoge, Setagaya-ku, Tokyo, Japan

[21] Appl. No.: 164,035

[22] Filed: Mar. 4, 1988

[30] Foreign Application Priority Data

Apr. 3, 1987 [JP] Japan .................................. 62-82520
Apr. 20, 1987 [JP] Japan .................................. 62-98446

[51] Int. Cl.$^4$ ............................................. B29D 11/00
[52] U.S. Cl. ..................................... 264/1.1; 264/1.9; 264/2.3; 264/250; 264/327; 264/331.18
[58] Field of Search ................. 264/323, 327, 250, 1.1, 264/1.9, 2.2, 2.5, 219, 319, 331.18, 2.3; 156/292

[56] References Cited

U.S. PATENT DOCUMENTS 3,555,126 12/1967 Gitson .................................. 264/219
4,091,057 5/1978 Weber .................................. 264/2.2

FOREIGN PATENT DOCUMENTS 1222708 10/1986 Japan .............................. 264/331.18

*Primary Examiner*—James Lowe
*Attorney, Agent, or Firm*—Jordan and Hamburg

[57] ABSTRACT

A transparent capsule is manufactured by using a lower die case having a substantially semi-spherical inner surface and an upper die cast having a substantially semi-spherical outer surface. The radius of the upper die cast is slightly smaller than that of the lower die cast. Transparent resin in the space between the lower die cast and said upper die cast is uniformly and gradually heated and then cooled in order to harden the transparent resin.

Thereafter, the upper die cast is separated from the lower die cast and the transparent resin formed in the shape of a sphere is removed from the die casts.

3 Claims, 5 Drawing Sheets

METHOD FOR MOLDING A TRANSPARENT CAPSULE

BACKGROUND OF THE INVENTION

The present invention relates to a method for manufacturing a transparent capsule, and in particular, relates to a method for manufacturing an almost spherical body comprising transparent resin such as acrylic resin or the like.

The present applicant has previously proposed in various ways a sun's ray collecting device in which the sun's rays are focused on a lens, guided into an optical conductor, and then transmitted through the optical conductor onto an optional desired place for use in illumination or for other like purposes. Furthermore, the present applicant has also proposed that the aforementioned sun's ray collecting device be accommodated in a transparent capsule in order to protect the lens thereof from wind, rain, dust and so on.

The sun's ray collecting device previously proposed by the present applicant has a cylindrical foundation, a dome-shaped head portion made of a transparent body, and a capsule for use in the sun's ray collecting device constructed with the foundation and the head portion. When the device is employed, the sun's ray collecting device is accommodated in the capsule. The sun's ray collecting device comprises, for instance, a large number of lenses, or a parabolic light collector, or a reflex mirror, etc. The sun's rays focused by the lenses or the parabolic light collector are guided into the optical conductor cable. Otherwise, the sun's rays reflected on the reflex mirror are guided into the photo-conductive tube or the like. The sun's rays guided in such a way are transmitted through the optical conductor cable or the photo-conductive tube onto an optional desired place.

And further, in the sun's ray collection device as mentioned above, the above-mentioned transparent capsule is usually made of acrylic resin. However, since the transparent capsule is employed for guiding the sun's rays thereinto, it is necessary to provide a fine polishing on the surface of the capsule in order to create a mirror-like surface for the purpose of reducing the loss of light transmission, due to diffused reflection, etc. and to make uniform the quality of the entire capsule in order to cause the light rays guided into the capsule to effectively propagate toward the lenses, the parabolic light collector, or the reflect mirror. However, when the transparent capsule is manufactured through the use of injection-molding or compression-molding methods, it is difficult to polish the surface thereof into a mirror and provide a proper finish to the capsule in order to make its quality uniform. It also makes it difficult to manufacture such a capsule at low cost.

Furthermore, when the capsule is manufactured by the use of the blow-molding method, it is difficult to make its' thickness uniform. And further, it is also difficult to create an almost completely spherical body, so that the capsule manufactured in the way just mentioned lacks a uniform quality.

SUMMARY OF THE INVENTION

It is an object of the present invention to provide a method for manufacturing a transparent capsule, in particular, manufacturing an almost spherical body comprising transparent resin such as acrylic resin or the like.

It is an object of the present invention to provide a method for manufacturing a substantially spherical transparent capsule having a mirror-like finished surface and an entirely uniform quality at low cost.

It is an object of the present invention to provide an improved capsule manufacturing method applicable to the case for making a capsule by combining two or three portions.

DESCRIPTION OF THE PREFERRED EMBODIMENTS

Figure 1:
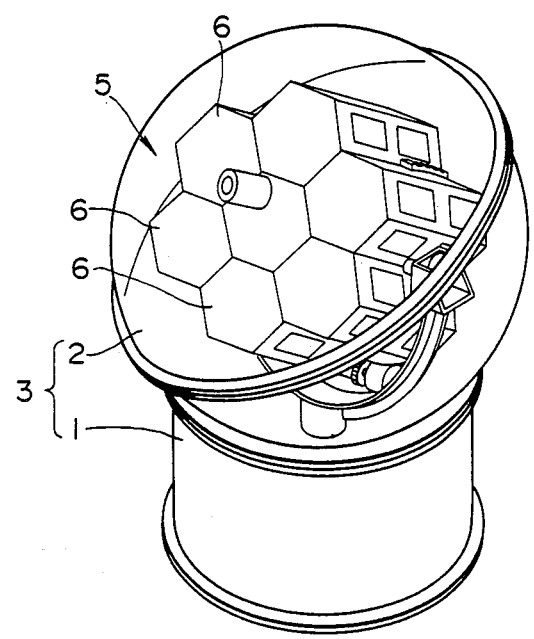
FIG. 1 is a perspective view for explaining the employment of a transparent capsule as previously proposed by the applicant.

FIG. 1 is a perspective view showing an embodiment of the sun's ray collecting device previously proposed by the present applicant. In FIG. 1, is a cylindrical foundation, 2 a dome-shaped head portion made of a transparent body, and 3 a capsule for use in the sun's ray collecting device constructed with the foundation 1 and the head portion 2. When the device is employed, the sun's ray collecting device 5 is accommodated in the capsule 3 as shown in FIG. 1. As is well known, the sun's ray collecting device comprises, for instance, a large number of lenses 6, or a parabolic light collector, or a reflex mirror, etc. The sun's rays focused by the lenses or the parabolic light collector are guided into the optical conductor cable. Otherwise, the sun's rays reflected on the reflex mirror are guided into the photo-conductive tube or the like. The sun's rays guided in such a way are transmitted through the optical conductor cable or the photo-conductive tube onto an optional desired place.

And further, in the sun's ray collecting device, as mentioned above, the above-mentioned transparent capsule is usually made of acrylic resin. However, since the transparent capsule is employed for guiding the sun's rays thereinto, it is necessary to provide a fine polishing to the surface of the capsule in order to create a mirror-like surface for the purpose of reducing the loss of light transmission, due to diffused reflection, etc. and to make uniform the quality of the entire capsule in order to cause the light rays guided into the capsule to effectively propagate toward the lenses, the parabolic light collector, or the reflex mirror. However, when the transparent capsule is manufactured through the use of injection-molding or compression-molding methods, it is difficult to polish the surface thereof into a mirror and provide a proper finish to the capsule in order to make its quality uniform. It also make it difficult to manufacture such a capsule at low cost.

Furthermore, when the capsule is manufactured by the use of the blow-molding method, it is difficult to make the thickness thereof uniform. And further, it is also difficult to create an almost completely spherical body, so that the capsule manufactured in the way just mentioned lacks a uniform quality.

Figure 2:
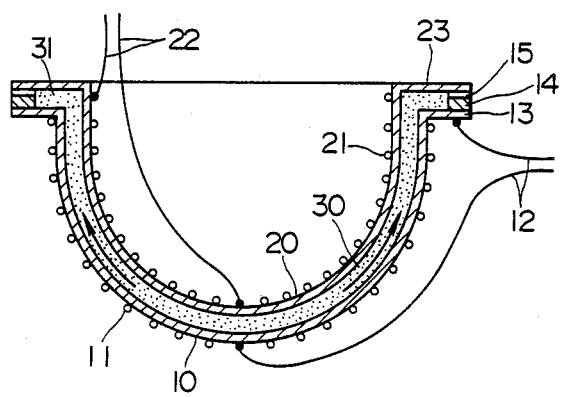
FIG. 2 is a cross-sectional view for explaining an embodiment of a manufacturing method for producing a transparent capsule according to the present invention.
Figure 3:
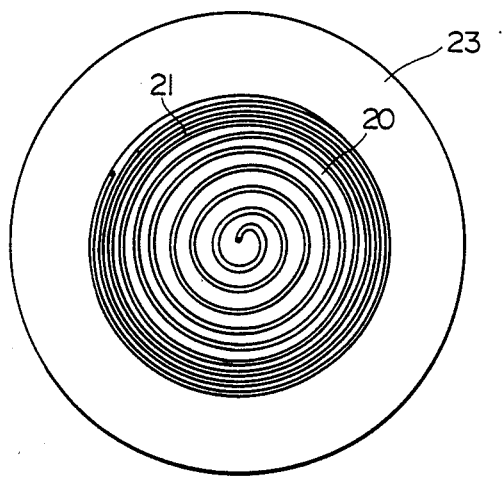
FIG. 3 is a plan view thereof.
Figure 10:
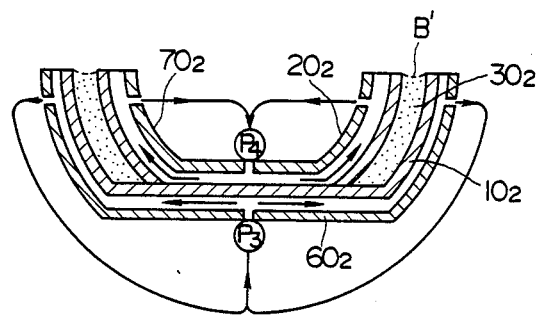

FIG. 2 is a cross-sectional construction view for explaining an embodiment of the present invention, and FIG. 3 is a plan view thereof. In FIGS. 2 and 3, 10 is a lower die cast and 20 is an upper die cast. Those lower and upper die casts 10 and 20 together are formed in a substantially semi-spherical body. The inner surface of the lower die cats 10 and the outer surface of the upper die cast 20 have a mirror-like finish. The inner surface of the lower die cast and the outer surface of the upper die cast are disposed coaxially with each other, and the radius of the upper die cast is a little smaller than that of the lower die cast. To be more specific, the former is smaller than the latter according to the thickness of the transparent capsule to be manufactured.

The reference numeral 30 represents a transparent capsule formed between the above-mentioned lower and upper die casts 10 and 20. The capsule 30 is manufactured, for instance, as follows by the use of the lower and upper die casts 10 and 20. At first, in the case of employing the lower and upper die casts 10 and 20, a heating wire 11 comprising a nichrome wire, etc. is arranged almost uniformly on the outer surface of the lower die cast 10, and another heating wire 21 comprising a nichrome wire, etc. is also arranged almost uniformly on the inner surface of the upper die cast 20. The heating wires are respectively connected through the lead wires 12 and 22 with a control device not shown in FIGS. 2 and 3.

And further, the lower and upper die casts 10 and 20 have flange portions 13 and 23 respectively at the opening portion side thereof. A spacer 14 having a uniform thickness over the entire circumference is put on the upper circumferential surface portion of the flange 13 formed on the lower die cast. A large number of grooves 15 extending in the direction of the radius are formed on the upper surface of the spacer 14. Those flange portions 13 and 23 are employed for molding a flange portion 31 at the same time on the molded transparent capsule 30, and in addition to that, for making uniform the thickness of the transparent capsule 30 by keeping constant the distance between the lower die cast 10 and the upper die cast 20.

In the case of manufacturing the transparent capsule by the use of the lower and upper die casts 10 and 20 as mentioned above, the upper die cast 20 is separated from the lower die cast 10 and a predetermined amount of transparent resin such as acrylic resin is poured into the lower die cast 10. On that occasion, it is possible to use either solid resin or fused resin. In any case, the resin is made in a state of being fused by heating the lower die cast 10 through the use of a heating wire 11.

In such a state, when the upper die cast 20 is pushed into the lower die cast 10, the gap between the inner surface side of the lower die cast 10 and the outer surface side of the upper die cast 20 is narrowed in proportion to the pushing of the upper die cast 20. The resin 30, made in a fused state in such a way as mentioned before, flows in both directions shown by the arrows according to the action of its fluidity. When the upper die cast 20 is put in a state as shown in FIG. 2, namely, the upper die cast 20 completely rests on the spacer 14 which in turn rests in the upper circumferential surface of the lower die cast 10, the space formed by the lower and upper die casts 10 and 20 and the spacer 14 being just filled with the resin. That is to say, since the volume of space formed by the lower and upper die casts 10 and 20, the spacer 14 and the thermal expansion coefficient of the resin, etc. are well known in advance, the amount of resin to be poured at the beginning will be known. Therefore, when the lower die cast 10 is set at a predetermined position in relation to the upper die cast 20, the resin can be put in the state as shown in FIG. 2.

In the embodiment of the present invention, an almost spherical transparent dome is molded through the effective utilization of the fluidity of the resin. A large number of grooves 15 formed on the upper surface of the spacer 14 are provided, for the purpose of preventing the flow of the resin from being obstructed by the action of the air existing in the space formed by the lower and upper die casts and the spacer 14 and for preventing the molded body from having a uniform quality due to a partial application of pressure, when the space formed thereby becomes gradually narrower in the way mentioned above. In addition, a rather large amount of resin poured into the space between both of the die casts is caused to overflow so as to produce neither strain nor deformation to the molded capsule.

Furthermore, the present invention utilizes the fluidity of resin which depends upon the atmospheric temperature. When the temperature of the lower and upper die casts 10 and 20 is low, the temperature of the fluid at the tip thereof is also low at the time of pouring. Consequently, not only does the fluidity of the fluid deteriorate, but the uniformity of the resin's quality is damaged. In order not to create such problems, in the embodiment as shown in FIGS. 1 and 2, heating wires comprising nichrome wire are uniformly and respectively arranged on the outer surface of the lower die cast 10 and on the inner surface of the upper die cast 20, and the temperature of the lower and upper die casts 10 and 20 is maintained at a pre-determined desired level by the use of those heating wires and in order to keep the fluidity of the resin constant.

After the space formed by the upper and lower die casts 10 and 20 and the spacer 14 is filled with the resin 30 as mentioned above, the power source for the heating wires is switched off, and the resin is allowed to harden by controlling the temperature. Specifically, the temperature is gradually lowered thereby cooling the entire contents of both die casts including gas, vapor, and liquid. In the next step, the molded capsule 30 is taken out after removing the upper die cast 20.

Moreover, although an example of temperature control performed by the heating wires respectively installed at the lower and upper die casts 10 and 20 has been described heretofore, the temperature control such as the temperature control of those lower and upper die casts and the temperature control for fusing or solidifying the resin isn't limited to the afore-mentioned embodiment. It can be easily understood that other heating means can be employed without installing heating wires on the upper and lower die casts, or temperature control can be performed by injecting a fluid such as a gas vapor, or some form of appropriate liquid, or otherwise the temperature of the entire space in the room can be controlled by use of an air conditioner.

Figure 4:
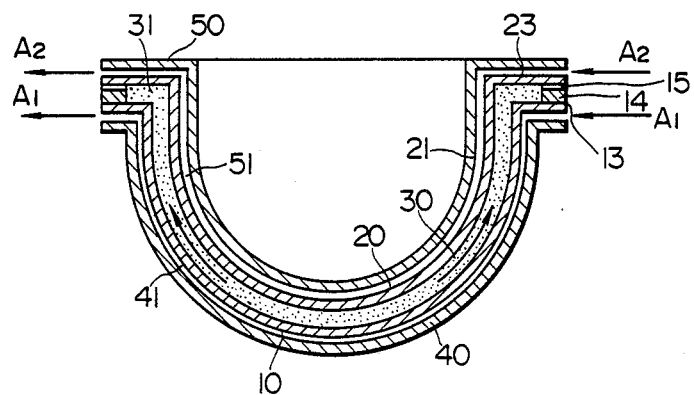
FIGS. 4 and 5 are, respectively, cross-sectional views for explaining other embodiments of the present invention.

FIG. 4 is a cross-sectional view of another embodiment of the heating means. In the embodiment of FIG.

4, a fluid passage forming body 40 is provided on the outer-surface side of the lower die cast 10 wherein a part of the wall forming the fluid passage 41 is the lower (outer) surface of the lower die cast 10, and fluid passage forming body 50 is provided at the inner surface of the upper die cast 20 wherein a part of the wall forming the fluid passage 51 is the upper (inner) surface of the upper die cast 20. A temperature-controlled liquid is caused to pass through the afore-mentioned fluid passages 41 and 51 respectively in the directions shown by arrows $A_1$ $A_2$. In such a way, since the temperature of the lower and upper die casts is kept constant, a partially high-temperature or low-temperature temperature portion isn't produced at all and thereby temperature control can be done even more uniformly.

Figure 5:
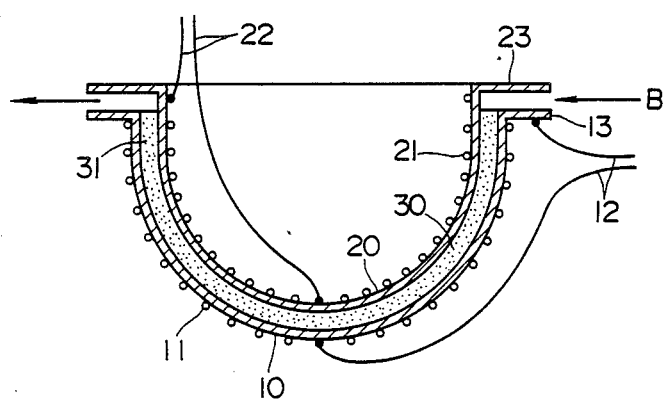

FIG. 5 is a cross-sectional view for explaining still another embodiment of the present invention. In the embodiment of FIG. 5, the lower die cast 10 and the upper die cast 20 are disposed at a pre-determined interval as shown in FIG. 5. Fused transparent resin 30 is poured into the gap formed therebetween as shown by an arrow B until the fused resin overflows from the die casts. The treatment process after pouring the resin is completely the same as that of the aforementioned other embodiments.

Moreover, although the spacer 14 employed in the embodiments of FIG. 2 and FIG. 4 is omitted, it may be easily understood that, also in this embodiment the spacer 14 is provided, and the melted transparent resin can be poured into the die casts from the grooves 15 formed on the spacer 14 and caused to overflow from the die casts.

Figure 6:
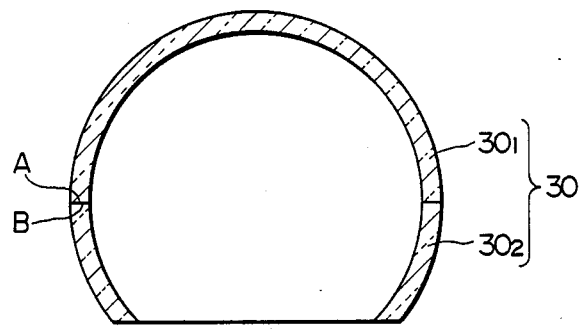
FIG. 6 is a cross-sectional view showing other examples of the transparent capsule.

FIG. 6 is a cross-sectional view showing another example of the transparent capsule manufactured in accordance with the present invention. The transparent capsule 30 consists of a spherical portion $30_1$ and another portion $30_2$ wherein one end portion of the portion $30_2$ is joined to the spherical portion $30_1$ and another end portion thereof is made to be open, and the portion $30_2$ makes up a part of another spherical body. The transparent capsule is constructed with the portions $30_1$ and $30_2$ by uniting both of them into one.

Figure 7:
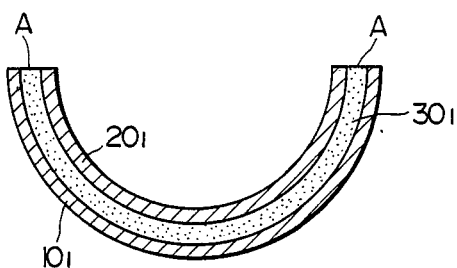
FIGS. 7 and 8 are, respectively, outline cross-sectional view for explaining an example of manufacturing the transparent capsule shown in FIG. 6.
Figure 8:
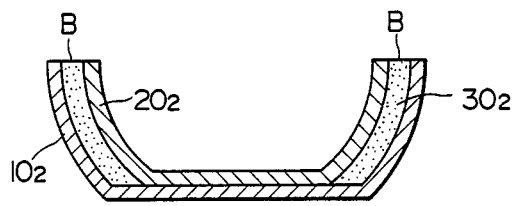

FIGS. 7 and 8 are respectively outlined, cross-sectional views for explaining an example for manufacturing the transparent capsule as shown in FIG. 6. FIG. 7 is an outline view showing a method for molding the portion $30_1$ shown in FIG. 6, and FIG. 8 is an outline view showing a method for molding the portion $30_2$ as shown in FIG. 6. Namely, the portion $30_1$ shown in FIG. 6 is manufactured by the use of the lower die cast $10_1$ and the upper die cast $20_1$ as shown in FIG. 7 in such a way as mentioned before, and the portion $30_2$ shown in FIG. 6 is also manufactured by the use of the lower and upper die casts $10_2$ and $20_2$ in the same way. The surface A of the portion $30_1$ and the surface B of the portion $30_2$ are opposed to each other and firmly joined thereafter. In such a way, by unitarily molding both portions $30_1$ and $30_2$, the capsule as shown in FIG. 6 can be manufactured.

As a matter of course, also in the embodiment, the flange portion can be formed and further the heating means can be provided as shown in the afore-mentioned embodiments. Furthermore, in case the flange portion is provided thereon, grooves 16 as those on the spacer 14 shown in FIG. 2 or FIG. 4 are respectively formed on the surface of the flange portion unitarily molded on the portion $30_1$ and on the surface of the flange portion unitarily molded on the portion $30_2$ in such a manner that both of the formed groves engage with each other in a complementary relationship therebetween. In such a way, the positioning of the surface A and the surface B can be performed very easily in the case of combining those portions $30_1$ and $30_2$ with each other as shown in FIG. 6.

An embodiment in which the surfaces of the lower and upper die casts and the resin are directly brought into contact with each other for molding the capsule unitarily has been described heretofore. Otherwise, before molding the capsule as mentioned above, the upper surface of the lower die casts 10, $10_1$ and $10_2$ and the lower surface of the upper die casts 20, $20_1$ and $20_2$ are dipped, for example, in a fused TEFLON tub. The teflon membrane is attached to the surfaces of those die casts and dried thereafter. In the next step, the transparent resin is fused and solidified. In such a way, the separation of the TEFLON membrane from the lower die cast and the upper die cast can be easily done. Furthermore, since the TEFLON membrane and the transparent resin are unitarily joined to each other in a suitable condition, the surface of the molded transparent capsule is treated with TEFLON. As a result, the surface of the manufactured, transparent capsule isn't apt to be injured so that a transparent capsule of good durable quality can be manufactured. Furthermore, when the molded capsule is taken out from the die casts, the separation of the die cast and the TEFLON membrane can be done very smoothly. It follows that the transparent capsule can be manufactured very easily. And further, the surface of the manufactured transparent capsule can be given a mirror finish with higher precision than in the past.

Figure 9:
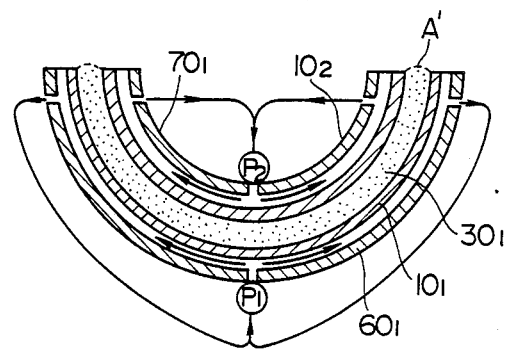
FIGS. 9 and 10 are cross-sectional views for explaining other embodiment of a manufacturing method for making a transparent capsule according to the present invention.

FIGS. 9 and 10 are cross-sectional explanatory views for explaining an embodiment of a capsule manufacturing method according to the present invention. In FIGS. 9 and 10, the same reference numerals as those in FIGS. 6 to 8 are attached to the respective portions performing the same action as that of FIGS. 6 to 8.

FIG. 9 is a cross-sectional view showing a manufacturing method for molding portion $30_1$ as shown in FIG. 6, and FIG. 10 is a cross-sectional view showing a manufacturing method for molding portion $30_2$ as shown in FIG. 6. In the case for molding portion $30_1$, a heating die cast $60_1$ to be placed opposite to the lower die cast $10_1$ and a heating die cast $70_1$ to be placed opposite the upper die cast $20_1$, are placed opposite to each other at a predetermined interval or distance in order to form a gap respectively with the lower die cast $10_1$ and the upper die cast $20_1$. A liquid of a high temperature for use in heating is supplied to those gaps by use of pumps $P_1$ and $P_2$ both having a heating means. And then, the gap formed between the lower die cast $10_1$ and the upper die cast $20_1$ is filled with a fused, transparent resin $30_1$. For instance, the volume of transparent resin $30_1$ is adjusted by pouring fused resin into the gap between the lower and upper die casts $10_1$ and $20_2$ and finally by making a convex meniscus A' at the upper end portion of the gap as shown in FIG. 9.

In the case of molding the portion $30_2$, as mentioned above, a heating die cast $60_2$ to be placed opposite the lower die cast $10_2$ is also opposedly disposed at a predetermined distance for forming a gap to the lower die cast $10_2$. In the same manner, a heating die cast $70_2$ to be placed opposite to the upper die cast $20_2$ is also opposedly disposed at a predetermined interval of distance for forming a gap to the upper die cast $20_2$. Liquid of high temperature for use in heating is supplied into those gaps by use of pumps $P_3$ and $P_4$ each having a heating means respectively. Then the gap formed between the lower die cast $10_2$ and the upper die cast $20_2$ is filled with a fused transparent resin $30_2$. For instance, the volume of the transparent resin $30_2$ is adjusted by pouring fused resin into the gap between the lower and upper die casts $10_2$ and $20_2$ thus forming a concave meniscus B' at the upper end portion of the gap as shown in FIG. 10.

In such a manner, after filling the gap with transparent resin, the entire portion is gradually cooled so that the resin contained therein is hardened as mentioned before. And then, after taking out the die cast frames, molded bodies $30_1$ and $30_2$ made of a transparent resin are taken out therefrom Next, in the same way, the molded resin blocks $30_1$ and $30_2$ are combined with each other in such a way that surface A' is brought into contact with surface B'. Since the meniscus surfaces A' and B' establish a mutual convex-concave relationship, both of the molded resin blocks $30_1$ and $30_2$ can be easily positioned and joined together by bringing the convex surface A' into contact with the concave surface B'.

In the embodiment described heretofore, the end surface of the portion $30_1$ is made convex while the end surface of the portion $30_2$ is made concave. However, it may be easily understood that, the convex-concave relationship thereof can be reversed, namely, the end surfaces of the portions $30_1$ and $30_2$ can be mae concave and convex respectively. Furthermore, although an embodiment in which heating fluid is employed as a heating means has been described heretofore, it may also be easily understood that heating fluid is not always necessary and that instead an other optional heating means such as an electric heating wire or the like may be used instead. (However, in the case of using a hot fluid, the distribution of heat is approximately uniform so that a capsule of uniform quality can be manufactured.) And further, it may be easily understood that the technology described otherwise with respect to FIGS. 2 to 8 can be applied to a manufacturing method for the capsule just as it is.

As is apparent from the foregoing description, according to the present invention, since the almost spherical transparent capsule is molded by the effective utilization of a fluid form of resin, it is possible to manufacture a capsule of a uniform quality and to have its surface finished like a mirror through a simple way and at low cost.

Further, according to the present invention, when a single transparent capsule is manufactured, the elements of the capsule are individually made in a state of two or more divided pieces and afterwards those elements are unitarily combined into one. On that occasion, those individually made pieces can be easily positioned and joined to the others, so that not only can the capsule be easily manufactured but the manufacturing accuracy thereof can be improved.

I claim:

1. A method for manufacturing a portion of a transparent capsule utilizing a lower die cast having a substantially semi-spherical inner surface having an outer flange and an upper die cast having a substantially semi-spherical outer surface having an outer flange in which the radius of said upper die cast is smaller than that of said lower die cast, the method comprising the steps of:
   disposing the outer surface of said upper die cast and the inner surface of said lower die cast coaxially with said inner surface being spaced from said outer surface and with said outer flange of said lower die cast being spaced from said outer flange of said upper die cast;
   disposing a spacer having a uniform thickness over its entire circumference and a large number of radial grooves on an upper surface thereof between said outer flange of said lower die cast and said outer flange of said upper die cast and utilizing said spacer to determine a molding space between said inner and outer surfaces, said grooves providing communication to said molding space;
   introducing fused transparent resin into said molding space between said inner and outer surfaces by pouring said resin through said radial grooves in said spacer;
   causing said resin to overflow from said molding space through said radial grooves and thereby venting said molding space and precluding pressurization of said molding resin in said space;
   uniformly and gradually cooling said lower die cast along with said upper die cast and said transparent resin to effect hardening of said resin in said molding space; and
   separating said upper die cast from said lower die cast and removing from said upper die cast and said lower die cast a molded body made of said transparent resin which together with another like molded body forms a spherical transparent capsule.

2. A method according to claim 1 further comprising passing a temperature controlled fluid through fluid passages in said upper die cast and in said lower die cast and thereby controlling the temperature of said upper and lower die casts.

3. The method according to claim 1 further comprising disposing heating elements alongside said upper and lower die casts and thereby controlling the temperature of said upper and lower die casts.

* * * * *